United States Patent [19]

McIntyre et al.

[11] 4,431,494

[45] Feb. 14, 1984

[54] METHOD FOR ELECTROLYTIC PRODUCTION OF ALKALINE PEROXIDE SOLUTIONS

[75] Inventors: James A. McIntyre; Robert F. Phillips, both of Midland, Mich.

[73] Assignee: The Dow Chemical Company, Midland, Mich.

[21] Appl. No.: 404,689

[22] Filed: Aug. 3, 1982

[51] Int. Cl.$^3$ .............................................. C25B 1/30
[52] U.S. Cl. ......................................... 204/83; 204/84
[58] Field of Search .................................... 204/84, 83

[56] References Cited

U.S. PATENT DOCUMENTS

| | | | |
|---|---|---|---|
| 2,051,951 | 8/1936 | Krauss et al. | 204/84 |
| 2,091,129 | 8/1937 | Berl | 204/84 |
| 3,227,643 | 1/1966 | Okun et al. | 204/195 P |
| 3,462,351 | 8/1969 | Grangaard | 204/83 |
| 3,507,769 | 4/1970 | Grangaard | 204/265 |
| 3,591,470 | 7/1971 | Grangaard | 204/84 |
| 3,969,201 | 7/1976 | Oloman et al. | 204/83 |
| 4,261,803 | 4/1981 | Suhara et al. | 204/98 |

*Primary Examiner*—R. L. Andrews
*Assistant Examiner*—Terryence Chapman

[57] ABSTRACT

An improved aqueous electrolyte solution adapted to minimize the decomposition of peroxide formed during electrolysis comprising an alkali metal compound, an impurity catalytically active for the decomposition of peroxides and a stabilizing agent at a concentration sufficient to render at least a portion of the catalytically active materials inactive.

The invention also includes a process for the production of peroxides which comprises electrolyzing the solution described above.

7 Claims, No Drawings

METHOD FOR ELECTROLYTIC PRODUCTION OF ALKALINE PEROXIDE SOLUTIONS

BACKGROUND OF THE INVENTION

This invention relates to the electrolytic production of peroxide solutions and specifically to the production of alkaline peroxide solutions.

Peroxide solutions are known to spontaneously decompose. The causes for such decomposition are thought to be (1) autodecomposition of the peroxide itself; and (2) catalytic decomposition caused by impurities in the peroxide solution.

Autodecomposition is commonly controlled by adjusting the pH of a peroxide solution to about 4.5 to 5.0, whereas, catalytic decomposition is minimized by adding stabilizing agents to the peroxide solution. Suitable stabilizing agents are known to include such things as stannates, phosphates and 8-hydroxyquinoline (*Hydrogen Peroxide*; W. C. Schumb, C. N. Satterfield, and R. L. Wentworth; pp. 535–543, Reinhold Publishing Corporation, 1955, New York, New York).

Recently developed electrochemical processes use an alkaline electrolyte to produce an alkaline peroxide solution. The high pH of the electrolyte causes a substantial amount of the peroxide to decompose during electrolysis in the cell. Thus, electrical energy is wasted by producing peroxides which decompose before they can be recovered. This autodecomposition problem is compounded by the usual catalytic decomposition problem.

The present invention concerns a composition and method of forming peroxide solutions which reduces the catalytic decomposition of the peroxide during electrolysis.

SUMMARY OF THE INVENTION

The invention is a solution suitable for use as an electrolyte in a process for the electrolytic production of alkaline peroxide solutions. The solution is an aqueous solution comprising an alkali metal compound, an impurity catalytically active for the decomposition of peroxides and a stabilizing agent at a concentration sufficient to render at least a portion of the catalytically active material inactive.

The invention also includes within its scope a process for the production of alkaline peroxide solutions which comprises electrolyzing the solution described above.

DETAILED DESCRIPTION OF THE INVENTION

The production of alkaline peroxide solutions involves the cathodic reduction of oxygen. The reactions are thought to proceed as follows:

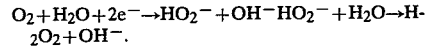

$$O_2 + H_2O + 2e^- \rightarrow HO_2^- + OH^- \quad HO_2^- + H_2O \rightarrow H_2O_2 + OH^-.$$

A more complete description of the reactions, the apparatuses and the processes used to produce alkaline peroxide solutions are found in the following patents and publications: U.S. Pat. No. 4,118,305, Oloman et al., Oct. 3, 1978; U.S. Pat. No. 3,969,201, Oloman et al., July 13, 1976; U.S. Pat. No. 3,507,769, Grangaard, Apr. 21, 1970; U.S. Pat. No. 3,454,477, Grangaard, July 8, 1969; U.S. Pat. No. 3,462,351, Grangaard, Aug. 19, 1969; "The Electroreduction of Oxygen to Hydrogen Peroxide on Fixed-Bed Cathodes," Oloman and Watkinson, *The Canadian Journal of Chemical Engineering*, Volume 54, pp. 312–318, August, 1976; "Hydrogen Peroxide Production in Trickle-Bed Electrochemical Reactors," Oloman and Watkinson, *Journal of Applied Electrochemistry*, (1979) pp. 117–123. The teachings of the above patents and articles are herein incorporated by reference.

It has been discovered that a stabilizing agent present in the electrolyte solution minimizes the amount of peroxide decomposed during electrolysis which maximizes the electrical efficiency of the cell, i.e., more peroxide is recovered per unit of energy expended.

To be suitable for use as a stabilizing agent, a compound must be chemically, thermally, and electrically stable to the conditions of the cell. Compounds that form chelates or complexes with the impurities have been found to be particularly suitable. These compounds include alkali metal salts of ethylene-diaminetetraacetic acid (EDTA), stannates, phosphates, and 8-hydroxyquinoline. Most particularly preferred are salts of EDTA because of their availability, low cost and ease of handling.

The stabilizing agent should be present in a concentration sufficient to inactivate at least a portion of the catalytically active impurities and preferably sufficient to inactivate substantially all of the impurities. The amount of stabilizing agent needed will differ with the amount of impurities present in a particular electrolyte solution. An insufficient amount of stabilizer will result in the decomposition of substantial amounts of peroxide. Conversely, excessive amounts of stabilizing agents are unnecessary and wasteful. The actual amount needed for a particular solution may be easily determined by monitoring the amount of peroxide decomposing during electrolysis, or, more preferably, by chemically analyzing the impurity concentration in the electrolyte. Stabilizing agent concentrations of from about 0.05 to about 5 grams per liter of electrolyte solution have generally been found to be adequate for most applications.

Alkali metal compounds suitable for use in the improved electrolyte solution are those that are readily soluble in water and will not precipitate substantial amounts of $HO_2^-$. Suitable compounds are known to include alkali metal hydroxides and alkali metal carbonates such as sodium carbonate. Alkali metal hydroxides such as sodium hydroxide and potassium hydroxide are particularly preferred because they are readily available and are easily dissolved in water.

The alkali metal compound preferably should have a concentration in the solution of from about 0.1 to about 2.0 moles of alkali metal compound per liter of electrolyte solution (moles/liter). If the concentration is substantially below 0.1 mole/liter, the resistance of the electrolyte solution becomes too high and excessive electrical energy is consumed. Conversely, if the concentration is substantially above 2.0 moles/liter, the alkali metal compound:peroxide ratio becomes too high and the product solution contains too much alkali metal compound and too little peroxide. When alkali metal hydroxides are used, concentrations from about 0.5 to about 2.0 moles/liter of alkali metal hydroxide have been found to be particularly suitable.

Impurities which are catalytically active for the decomposition of peroxides are also present in the solution. These substances are not normally added intentionally but are present only as impurities. They are usually dissolved in the solution, however, some may be only suspended therein. They include ions of lead, iron, copper, and chromium. As a general rule, the rate of decomposition of the peroxide increases as the concentration of the catalytically active substance increases. However, when more than one of the above-listed ions are present the effect of the mixture is frequently synergistic, i.e., the peroxide decomposition rate when more than one type of ion are present is greater than the sum of the individual peroxide decomposition rate when only one type of ion is present. The actual concentration of these impurities depends upon the purity of the components used to prepare the electrolyte solution and the types of materials the solution contacts during handling and storage. Impurity concentrations of less than 0.1 part per million are known to have a detrimental effect on the stability of peroxide solutions.

The solution is prepared by blending an alkali metal compound and a stabilizing agent with an aqueous liquid. The alkali metal compound dissolves in the water, while the stabilizing agent either dissolves in the solution or is suspended therein. Optionally, the solution may be prepared by dissolving or suspending a stabilizing agent in a previously prepared aqueous alkali metal compound solution, or by dissolving an alkali metal compound in a previously prepared aqueous stabilizing agent solution. Optionally, the solutions may be prepared separately and blended together.

The prepared aqueous solution has a concentration of from about 0.01 to about 2.0 moles alkali metal compound per liter of solution and about 0.05 to about 5.0 grams of stabilizing agent per liter of solution. Other components may be present in the solution so long as they do not substantially interfere with the desired electrochemical reactions.

A preferred solution is prepared by dissolving about 40 grams of NaOH (1 mole NaOH) in about 1 liter of water. Next, 1.5 ml. of an aqueous 1.0 molar solution of the sodium salt of EDTA is added to provide an EDTA concentration of 0.5 gram per liter of solution. The so-prepared solution is ready for use in an electrochemical cell.

Suitable electrolytic cells comprise an anode and a cathode spaced apart by a separator. The separator is usually a hydraulically permeable sheet of asbestos fibers, although an ion exchange membrane sheet could also be used. The separator impedes the flow of liquids between the compartments housing the two electrodes. The cathode may be a hydraulically permeable, electrically conductive body having a plurality of passageways, while the anode may be a solid, electrically conductive body. The electrodes are connected through a power supply which provides electrical energy to the cell. The anode compartment has an electrolyte inlet and an outlet port, while the cathode compartment usually has only an outlet port. A gas chamber adjoins one face of the cathode and provides a pathway for gas to contact a face of the cathode.

In operation, the improved electrolyte solution described above is fed into the anode chamber of the cell. At least a portion of it flows through the separator, into the cathode compartment and into passageways of the cathode. An oxygen-containing gas is fed through the gas chamber and into the cathode passageways where it meets the electrolyte. Electrical energy, supplied by the power supply, is passed between the electrodes at a level sufficient to cause the oxygen to be reduced to form hydrogen peroxide. In most applications, electrical energy is supplied at about 1.0 to about 2.0 volts at about 0.05 to about 0.5 amp per square inch.

The so-formed peroxide solution is then removed from the cathode compartment through the outlet port.

The concentration of impurities which would ordinarily catalytically decompose the peroxide during electrolysis is minimized. They have been chelated or complexed with the stabilizing agent. Thus, the cell operates in a more efficient manner.

EXAMPLE 1

An electrochemical cell having a platinum coated titanium anode and a carbon particle, packed bed cathode separated by a porous asbestos diaphragm was used to produce an alkaline peroxide solution. An aqueous sodium hydroxide electrolyte solution having a concentration of about 1.0 mole NaOH per liter of solution and iron ions at a concentration of about 1–2 parts per million was fed into the chamber housing the anode. The solution also contained about 0.5 gram of a sodium salt of EDTA per liter of solution. A portion of the electrolyte was flowed through the porous separator, into the cathode compartment, and into the cathode passageways. Oxygen gas was fed into the cathode passageways through a side of the cathode adjoining a gas chamber. The oxygen gas was electrochemically reacted with water contained in the electrolyte to form an alkaline peroxide solution. The electrical current was maintained at about 0.2 amp per square inch at about 2 volts. The alkaline peroxide solution was then removed from the cathode compartment. The current efficiency of the cell was determined to be about 36 percent.

COMPARATIVE EXAMPLE

The electrochemical process described in Example 1 was repeated, except no stabilizing agent (EDTA) was added to the sodium hydroxide electrolyte solution. Current efficiency of the cell was found to be about 28 percent.

What is claimed is:

1. A process for the production of peroxides comprising:
   electrolyzing an aqueous alkaline solution containing an impurity catalytically active for the decomposition of peroxides and a stabilizing agent selected from the group consisting of complexing agents and chelating agents, said stabilizing agent being present at a concentration sufficient to render at least a portion of the catalyst inactive.
2. The process of claim 1 wherein the stabilizing agent is a chelating agent.
3. The process of claim 2 wherein the chelating agent is an alkali metal salt of ethylene-diaminetetraacetic acid.
4. The process of claim 3 wherein the alkali metal salt is sodium.
5. The process of claim 1 wherein the solution contains an alkali metal hydroxide.
6. The process of claim 5 wherein the alkali metal hydroxide is selected from the group consisting of potassium hydroxide and sodium hydroxide.
7. The process of claim 1 wherein the stabilizing agent is present at a concentration of from about 0.5 to about 5.0 grams per liter of solution.

* * * * *

UNITED STATES PATENT AND TRADEMARK OFFICE
CERTIFICATE OF CORRECTION

PATENT NO. : 4,431,494
DATED : Feb. 14, 1984
INVENTOR(S) : James A. McIntyre; Robert F. Phillips It is certified that error appears in the above—identified patent and that said Letters Patent is hereby corrected as shown below:

Col. 4, Claim 7, line 64, delete "0.5" and insert --0.05--.

Signed and Sealed this

Thirty-first Day of July 1984

[SEAL]

Attest:

Attesting Officer

GERALD J. MOSSINGHOFF

Commissioner of Patents and Trademarks